(No Model.)
C. A. BOUCK.
BICYCLE.
No. 356,095. Patented Jan. 18, 1887.
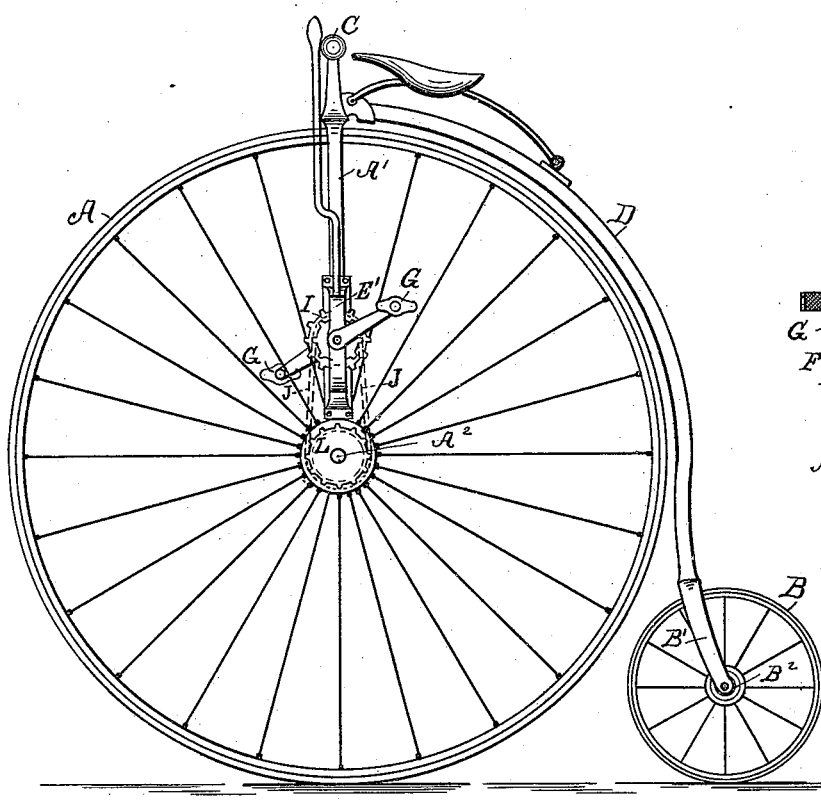
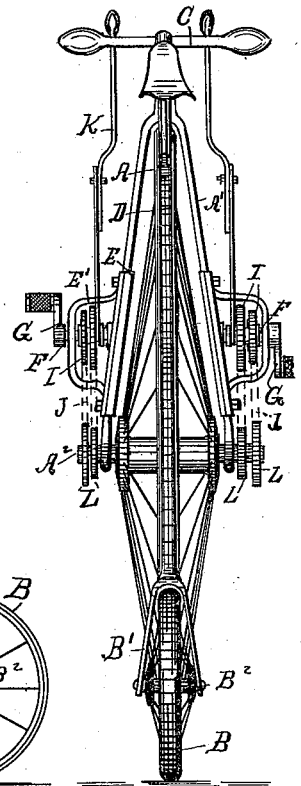
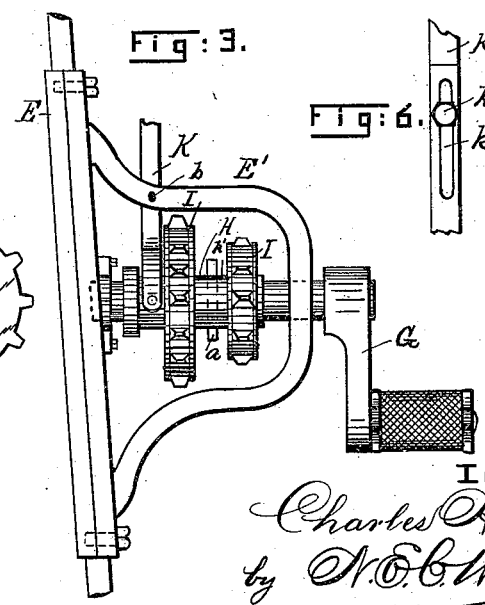
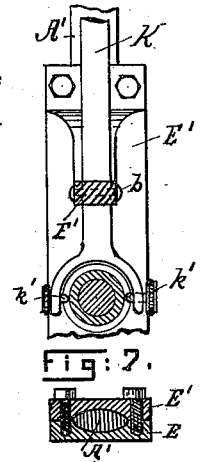
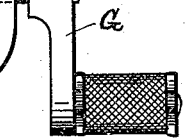
Witnesses:
R. F. Brandom,
M. R. Whitney
Inventor.
Charles A. Bouck
by N. C. Whitney
Attorney
N. PETERS, Photo-Lithographer, Washington, D. C.

UNITED STATES PATENT OFFICE.

CHARLES A. BOUCK, OF NEW CARLISLE, OHIO.

BICYCLE.

SPECIFICATION forming part of Letters Patent No. 356,095, dated January 18, 1887.

Application filed August 12, 1885. Renewed September 25, 1886. Serial No. 214,518. (No model.)

*To all whom it may concern:*

Be it know that I, CHARLES A. BOUCK, of the town of New Carlisle, county of Clark and State of Ohio, have invented certain new and useful Improvements in Bicycles, of which the following is a specification.

This invention relates to bicycles. The object of the invention being to provide a cheap, simple, and durable apparatus which may be quickly and readily attached to any bicycle of standard pattern, to accomplish the following results, viz: change the height of pedals or cranks with relation to the fork-handles, so that a small person may ride a bicycle having a large wheel; change the speed of bicycle more or less, as desired, and at will, while the bicycle is in motion or otherwise, and allow the cranks to remain idle during rotation of the wheels, to allow the person riding to rest his feet upon the crank-pedals while riding down an incline.

My invention consists in certain details of construction of the apparatus and its several parts, as hereinafter fully described.

In the drawings, Figure 1 represents in side elevation a bicycle as provided with my improvements; Fig. 2, a rear elevation of the same; Fig. 3, an enlarged view of the crank-shaft, crank, driving-wheels, and bracket for supporting the same; Fig. 4, a longitudinal section and face view of one of the sprocket-wheels, showing its ratchet; Fig. 5, a section on dotted line, $x$ $x$, Fig. 3, looking in the direction of the arrow; and Fig. 6, a face of a portion of the shifting-lever which throws the sprocket-wheels into and out of engagement with the crank-shaft, said figure showing the manner of adjusting the lever to increase or decrease the length.

The main portion of the bicycle, which consists of the main wheel A, rear wheel, B, forks A' and B', fork-handle C, backbone D, and axles A², B², are and may be all of usual construction, together with the saddle and its spring.

My attachment consists of a bracket constructed in two parts, E E', adapted to be clamped together around the fork of the bicycle, as shown in Figs. 1, 2, and 3 most clearly, the said bracket being sloping at one side to correspond to the pitch of the fork, and being slightly concaved at joining faces to correspond to the convexity of said fork, as shown clearly in Fig. 7. This bracket will preferably be made of cast metal and very light, the part E' being open at its center and extended out a distance sufficiently far to permit the sprocket-wheels, hereinafter described, to work therein, and being provided with journal-bearings to support the main crank-shaft F, which crank-shaft rests in the bearing nearest the fork of the tricycle and extends through the bearing in the bracket-arms, where it is provided upon the outside of the bracket with the crank G and pedal. The fork-grasping faces of the bracket are provided, preferably, with a flexible covering, or gaskets, such as rubber, or a substance which will take up or compensate for any irregularity in shape of the faces of the bracket with reference to the fork, and which will grasp the fork without marring it and obviate slippage.

I do not desire to limit myself to any special form of bracket, as the bracket might be formed in many ways to accomplish the purpose for which it is intended.

The bracket is clamped to and around the fork of the large wheel at the point thereon most desirable to secure the proper relation between the pedals and rider by means, preferably, of bolts or lag-screws extending through the bracket-half E and entering screw-threaded openings in the half E'; or, if desirable, the bolts might extend through both halves and provided with a nut to clamp the parts together, the bolts or screws being extended into the bracket at one side of the outer edges of the fork, as shown in Fig. 5.

Loosely mounted upon the crank-shaft F through the medium of a sleeve, H, having an elongated slot, $h'$, in its upper and lower face, are two sprocket-wheels, I, having their adjacent faces notched or provided with ratchet-teeth $i'$, to be engaged by a pawl, $a$, extending through the shaft and sleeve. These sprocket-wheels are mounted loosely upon the collar or sleeve H, which sleeve is provided with collars at either end, and are adapted to be moved back and forth into and out of engagement with the pawl $a$ by means of the shifting-lever K, which encircles the sleeve H near one end, and is pivoted to the bracket E' at $b$, where it extends upward to or near the handles of the bicycle. This lever will preferably be constructed in two pieces and made adjustable to different lengths, one construction being shown in Figs. 2 and 6.

I do not desire to limit myself to the exact manner of constructing the lever K, as herein shown; neither do I desire to limit myself to the manner in which the sprocket-wheels I are connected to the crank-shaft and the manner of throwing them into and out of gear, as this may be done in many ways with satisfactory results.

In practice the sprocket-wheels I will be of different sizes, and there may be two or more used, if desired, the object being to increase or decrease the speed of the bicycle.

Extending from the sprocket-wheels I, down to and around sprocket-wheels L upon the axle $A^2$ of the wheel A are sprocket-chains J, (shown in dotted lines,) which operate the sprocket-wheels L. These wheels L are keyed to the axle $A^2$, and in such manner that a small wheel, L, of the axle $A^2$ will be directly below a large wheel, I, on the crank-shaft F and the large wheel opposite a small wheel, the purpose of which will be readily apparent.

Instead of using sprocket-wheels and chains, as described, pulleys and belts might be used, if desired.

The usefulness of my construction of apparatus for the purposes herein set forth will be readily appreciated, as any bicycle may be changed so that a large or small person may operate it, and the apparatus may be run at a high or low speed.

To attach my device to a bicycle, it is simply necessary to remove the cranks from the axle of the large wheel, place in their stead sprocket-wheels and key or secure them in place, attach the brackets with its shaft and apparatus to the forks of the bicycle and put the cranks removed from the axle on the ends of the crank-shafts, connect the sprocket-chains to the sprocket-wheels above and extend them over the wheels below, when the apparatus is ready for operation.

To change the speed of the bicycle or tricycle, the sprocket-wheels I being normally loose upon the crank-shaft it is simply necessary to throw the large or small wheel over until it is engaged by the pawl $a$, secured to the crank-shaft, which wheel, being connected by chains to the wheel below, will govern the rotation of the main shaft or axle $A^2$.

The lever K, which operates to throw the sprocket-wheels into and out of gear with the crank-shaft, is herein shown as forked at its lower end, (see Fig. 5,) where it is provided with screws $k'$, which extend between the collar of the sleeve on which the sprocket-wheels turn and the sprocket-wheel, this construction being provided to compensate for any wear of the collar which may occur.

The upper end of the lower half of the lever K is slotted as at $k^2$, and a bolt, $k^3$, extended through the slot into the upper part of the lever, the two parts being overlapped, this being a simple means of adjustment, it simply being necessary to loosen the screw or bolt $k^3$ and slide the one part of the lever over the other (more or less) when it is desired to lengthen or shorten the lever and tighten the bolt to secure the parts firmly in place.

In practice, the handle-bar will be provided with a rack to hold the shifting-lever K, which extends above it, in its adjusted position.

My improved apparatus is applicable to some tricycles as well as bicycles, as will be observed.

I claim—

1. In a bicycle, the combination of the sprocket-wheels L, secured to the axle of the main or large wheel, the two-part bracket adjustably secured to the fork $A'$ of large wheel, the crank-shaft F, mounted in said bracket, and the sprocket-wheels I, mounted upon said crank-shaft, all constructed and arranged substantially as shown and described.

2. In a bicycle, the combination, with the sprocket-wheels L, fixed to the axle of the large wheel, of the sprocket-wheels I, located above the wheels L, the crank-shaft F, having a crank or pedal at its one end, as shown, said sprocket-wheels I being loosely mounted upon the shaft F, the two-part bracket E E', in which the crank-shaft is mounted, said bracket being adjustably clamped upon the fork of the large wheel, a clutch device to engage one or both of the sprocket-wheels I with the shaft F, and a lever to operate said clutch device, all constructed and arranged substantially as shown and described.

In witness whereof I have hereunto set my hand and seal, at Springfield, Ohio, this 11th day of July, A. D. 1885.

CHARLES A. BOUCK. [L. S.]

In presence of—
P. J. CLEVENGER,
N. E. C. WHITNEY.